United States Patent [19]

Fischer et al.

[11] Patent Number: 5,603,593
[45] Date of Patent: Feb. 18, 1997

[54] EXPANSIBLE FIXING PLUG OF PLASTIC MATERIAL

[75] Inventors: Artur Fischer; Wolfgang Nehl, both of Waldachtal, Germany

[73] Assignee: fischerwerke, Artur Fischer GmbH & Co. KG

[21] Appl. No.: 513,533

[22] Filed: Aug. 10, 1995

[30] Foreign Application Priority Data

Aug. 19, 1994 [DE] Germany .......................... 94 13 434 U

[51] Int. Cl.$^6$ .................................................. F16B 13/06
[52] U.S. Cl. .................................................. 411/55; 411/60
[58] Field of Search ................................ 411/60, 57, 55, 411/908, 913, 15, 44

[56] References Cited

U.S. PATENT DOCUMENTS

| | | | |
|---|---|---|---|
| 1,202,159 | 10/1916 | Camden | 411/60 |
| 3,187,620 | 6/1965 | Fischer | 411/60 |
| 4,488,843 | 12/1984 | Achille | 411/60 |

FOREIGN PATENT DOCUMENTS

| | | | |
|---|---|---|---|
| 0234183 | 9/1987 | European Pat. Off. | 411/15 |
| 1097117 | 11/1958 | Germany . | |
| 653541 | 12/1962 | Germany | 411/60 |
| 2847595 | 5/1980 | Germany . | |
| 3048654 | 7/1982 | Germany . | |
| 4117503 | 12/1992 | Germany . | |
| 7807993 | 1/1979 | Netherlands | 411/69 |

*Primary Examiner*—Flemming Saether
*Attorney, Agent, or Firm*—Michael J. Striker

[57] ABSTRACT

An expansible fixing plug, comprising a body part composed of a plastic material and having a leading end and a rear end, the body part having a longitudinal channel extending from the rear end for insertion of a fixing screw and the like. The longitudinal channel has a cylindrical portion approximately corresponding to an external diameter of the screw. A narrowing portion adjoins the cylindrical portion. The body part also has a slot extending from the leading end over a part of a length of the body part. The narrowing portion of the longitudinal channel has a cross-section starting from the cylindrical portion and having a lozenge shape. The narrowing portion of the longitudinal channel in a plane of the slot has a corner to corner width which remains the same for an entire length of the narrowing portion and substantially corresponds to a diameter of the cylindrical portion. The narrowing portion at right angles to the plane of the slot has a corner to corner width which decreases toward the leading end of the body part.

5 Claims, 2 Drawing Sheets

EXPANSIBLE FIXING PLUG OF PLASTIC MATERIAL

BACKGROUND OF THE INVENTION

The present invention relates to expansible fixing plugs composed of a plastic material.

More particularly, it relates to an expansible fixing plug which has a slot extending over a part of its length and a longitudinal channel provided for insertion of a fixing screw or the like.

Expansible fixing plugs of the above mentioned general type are known in the art. One of such plugs is disclosed for example in the German patent document DE-PS 10 97 117. This document discloses a cylindrical expansible fixing plug provided with a slit extending over a part of its length, and a rear end provided with a longitudinal bore for insertion of a fixing screw. The front portion of the longitudinal bore is cylindrical and has a diameter corresponding approximately to an external diameter of the fixing screw. Adjoining the cylindrical portion, there is a conical taper which terminates in the slit of the fixing plug and has the shape of the clef in the leading end region. The conical taper of the longitudinal bore of the fixing plug causes a circular-section narrowing which presents a high insertion resistance as the fixing screw is screwed in. Although the expansible segments of the fixing plug formed by the longitudinal slot are yieldable at right angles to the plane of the slot to reduce the insertion resistance, in the plane of the slot the thread of the fixing screw must nevertheless become cut fully into the material of the fixing plug. Since the fixing plug cannot extend in the plane of the slot, this increased insertion resistance is not converted into a corresponding expansion force. Because of the increased insertion resistance, it is possible, particularly in the case of drilled holes that are too big, for the fixing plug to turn with the fixing screw as it is screwed in, despite anti-rotation ribs arranged on the outer circumference of the plug.

The German patent document DE 41 17 503 A1 discloses an improved fixing plug in which it is proposed to narrow the cylindrical portion of the cylindrical bore at right angles to the plane of the slot to the width of the slot. The diameter of the cylindrical portion and the plane of the slot is approximately retained in the region of the narrowing. Therefore, a narrowing of the elliptical cross-section is produced, so that insertion resistance is reduced. However, the guidance of the screw is adversely affected as it is screwed into the fixing plug. As a result, the screw may therefore run off course in the fixing plug, and it becomes impossible to anchor the fixing plug properly.

SUMMARY OF THE INVENTION

Accordingly, it is an object of the present invention to provide an expansible fixing plug of the above mentioned type, which avoids the disadvantages of the prior art.

More particularly, it is an object of the present invention to provide an expansible fixing plug which is formed so that in addition to the reduction in the insertion resistance without loss of holding value, improved guidance of the screw as it is screwed into the expansible fixing plug is also provided.

In keeping with these objects and with others which will become apparent hereinafter, one feature of the present invention resides, briefly stated, in an expansible fixing plug in which the cross-section of the narrowing, starting from the cylindrical portion of the longitudinal channel, has a lozenge shape such that the corner to corner width in the plane of the slot remains the same for the entire length of the narrowing and corresponds approximately to the diameter of the cylindrical portion, while the corner to corner width at a right angle to the plane of the slot decreases toward the leading end of the expansible fixing plug.

When the expansible fixing plug is designed in accordance with the present invention, it provides for the above mentioned advantages. Since the cross-section of the narrowing has a lozenge shape, therefore the screw is screwed in, it bears against four points uniformly distributed around the circumference and therefore the best possible centering effect is produced. At the same time, the pressing action acting uniformly on all four faces of the lozenge shape provides optimal conversion of the pressing force into expansion force. Irrespective of that, the insertion resistance is reduced, without loss of holding value, since the corner to corner width of the lozenge shape in the plane of the slot remains the same so as to approximately correspond to the diameter of the cylindrical portion for the entire length of the narrowing. Only the corner to corner width at right angles to the plane of the slot reduces toward the leading end of the expansible fixing plug and therefore provides the narrowing required for the expansion.

The run out of the narrowing can be shaped in correspondence with the use of the expansible fixing plug. For soft and porous building materials, such as aerated concrete, it is recommended to shape the narrowing of the expansible fixing plug so that, before the leading end, the corner to corner width at right angles to the plane of the slot narrows inside the expansible fixing plug to the width of the slot and terminates in a cleft. The longest possible expansion force is therefore obtained in the region of the cleft. In order to avoid displacement in the longitudinal direction of the two expansible arms formed by the slot as the screw is screwed into such a fixing plug, it is furthermore recommended to provide the cleft with a portion extending in a zig-zag manner. The zig-zag configuration of the cleft produces protuberances in the plane of the slot to allow an even greater expansion.

For further reduction of the insertion resistance, the outer surface of the expansible fixing plug can be provided with longitudinal rabbets extending along both slot edges. Therefore the regions of the expansible fixing plug which merely lead to jamming in the drilled hole and to contribute to an increase in the holding value are removed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
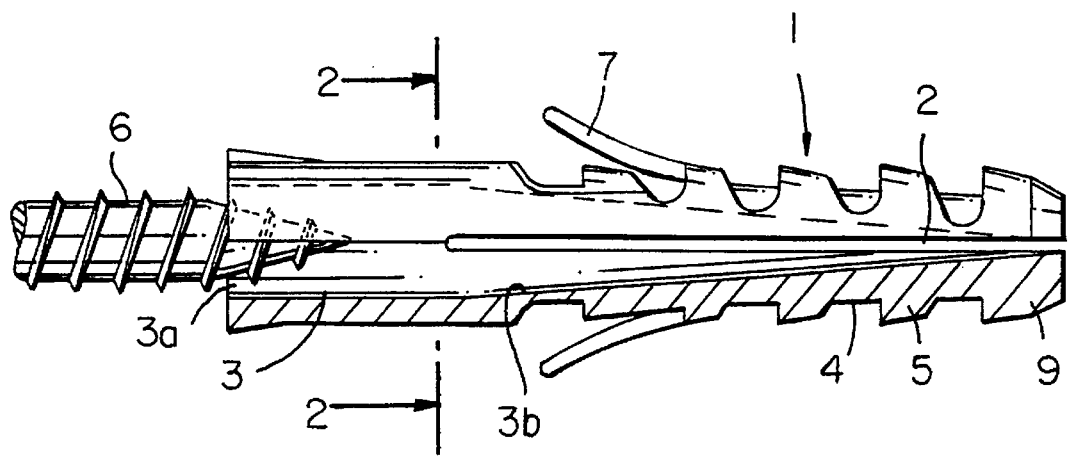
FIG. 1 is a view showing a partial longitudinal section of an expansible fixing plug in accordance with the present invention.
Figure 2:
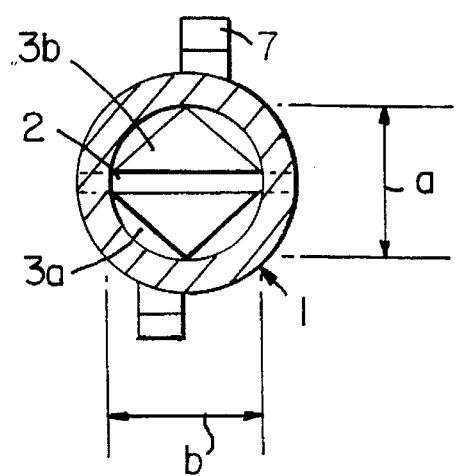
FIG. 2 is a view showing the expansible fixing plug of the invention in a cross-section taken along the line A—A in FIG. 1.

An expansible fixing plug in accordance with the present invention is identified as a whole with reference numeral 1. It has a longitudinal channel 3 with a cylindrical channel portion 3a. A slot 2 extends in a longitudinal direction. It starts from a leading end 6 of the fixing plug 1 and extends as far as the cylindrical portion 3a of the longitudinal channel 3. Several notches are provided on the cylindrical outer surface of the fixing plug 1. Teeth 5 are formed on the cylindrical outer surface of the fixing plug 1 between the notches 4. The teeth dig into soft material as the fixing plug is expanded, and in hard building materials they produce corresponding frictional force at the wall of the drilled hole as a result of undergoing plastic deformation.

The longitudinal channel 3 further has a narrowing portion 3b which adjoins the cylindrical portion 3a. The narrowing portion 3b terminates in a leading-end region 9 of the plug 1. The narrowing portion 3b has a cross-section of a lozenge shape. In particular, the corner to corner width of the narrowing portion at right angles to the plane a of the slot 2 decreases toward the leading end 9 of the expansible fixing plug. The corner to corner width of the narrowing portion in the plane b of the slot 2 remains the same for the entire length of the narrowing and approximately corresponds to the diameter of the cylindrical portion 3a. The fixing screw 6 which expands the plug is therefore guided in the narrowing 3b through the lozenge-shaped cross-section of the narrowing for the entire length of the plug.

As the fixing screw 6 penetrates the narrowing portion 3b, expansion of the expansible fixing plug starts. Since the narrowing portion is made only at right angles to the plane of the slot with low insertion resistance, an optimum radial expansion of the plug is obtained. As a result of the lower insertion resistance which is converted immediately into expansion force, the risk of the plug turning with the screw as the screw is screwed can be hardly feared. However, it is recommended to provide the plug additionally with locking tongues 7, particularly for drilled holes that are too big.

Figure 3:
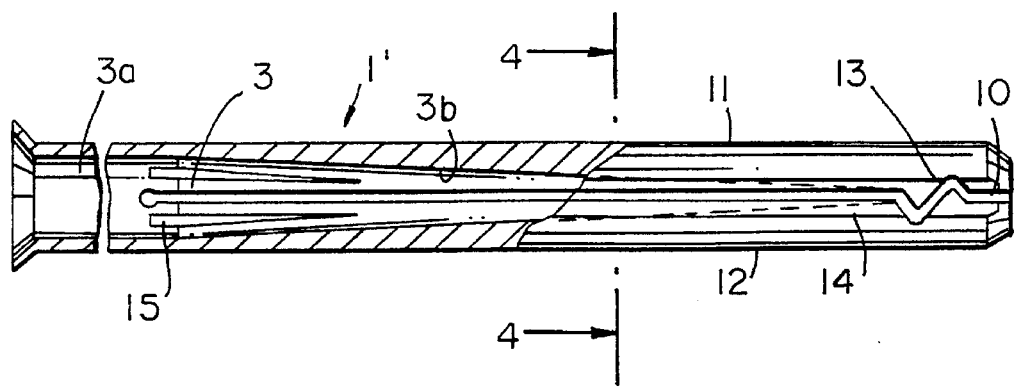
FIG. 3 is a view showing a partial longitudinal section of an expansible fixing plug in accordance with a further embodiment of the present invention.
Figure 4:
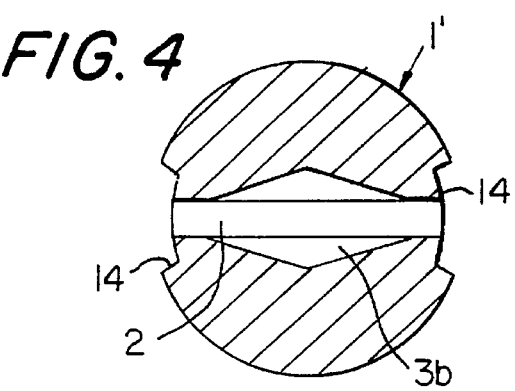
FIG. 4 is a view showing a cross-section of the expansible fixing plug along the line B—B in FIG. 3.

An expansible fixing plug 1' in accordance with a further embodiment is shown in FIGS. 3 and 4. In this fixing plug the narrowing 3b extends inside the plug down to the slot width and terminates in a cleft 10. The cleft has a portion 13 which runs in a zig-zag and therefore provides two expansible arms 11 and 12 with teeth. The outer surface of the expansible fixing plug 1' is provided with longitudinal rabbets 14 extending along the two edges of the slot. Furthermore, longitudinal ribs 15 are provided and terminate in the narrowing portion 3b. Grips start from the cylindrical portion 3a of the longitudinal channel 3 and extend into the narrowing portion 3b. The fixing screw therefore cuts its way more easily as it is screwed into the expansible fixing plug 1'.

It will be understood that each of the elements described above, or two or more together, may also find a useful application in other types of constructions differing from the types described above.

While the invention has been illustrated and described as embodied in an expansible fixing plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An expansible fixing plug, comprising a body part composed of a plastic material and having a leading end and a rear end, said body part having a longitudinal channel extending from said rear end for insertion of a fixing screw, said longitudinal channel having a cylindrical portion, and a narrowing portion adjoining said cylindrical portion, said body part also having a slot of a substantially constant width extending from said leading end over a part of a length of said body part, said narrowing portion of said longitudinal channel having a cross-section starting from said cylindrical portion and of a lozenge shape, said narrowing portion of said longitudinal channel in a plane of said slot having a corner to corner width which remains the same for an entire length of said narrowing portion and substantially corresponds to a diameter of said cylindrical portion, said narrowing portion at right angles to said plane of said slot having a corner to corner width which decreases toward said leading end of said body part.

2. An expansible fixing plug as defined in claim 1, wherein said corner to corner width of said narrowing portion at right angles to said plane of said slot narrows inside said body part to a width of said slot and terminates in a cleft.

3. An expansible fixing plug as defined in claim 2, wherein said cleft has a portion running in a zig-zag.

4. An expansible fixing plug as defined in claim 1, wherein said body part has an outer surface provided with longitudinal rabbets extending along both edges of said slot.

5. An expansible fixing plug, comprising a fixing screw; and a body part composed of a plastic material and having a leading end and a rear end, said body part having a longitudinal channel extending from said rear end for screwing said fixing screw in said body part and therefore expanding said body part portion approximately corresponding to an external diameter of said fixing screw, and narrowing portion adjoining said cylindrical portion, said body part also having a slot of a substantially constant width extending from said leading end over a part of a length of said body part, said narrowing portion of said longitudinal channel having a cross-section starting from said cylindrical portion and of a lozenge shape, said narrowing portion of said longitudinal channel in a plane of said slot having a corner to corner width which remains the same for an entire length of said narrowing portion and substantially corresponds to a diameter of said cylindrical portion, said narrowing portion at right angles to said plane of said slot having a corner to corner width which decreases toward said leading end of said body part.

\* \* \* \* \*